United States Patent
Aoki et al.

(10) Patent No.: US 6,903,274 B2
(45) Date of Patent: Jun. 7, 2005

(54) HARNESS PROTECTOR AND STRUCTURE FOR SUPPLYING ELECTRIC POWER USING THE PROTECTOR

(75) Inventors: Tohru Aoki, Shizuoka (JP); Tsukasa Sekino, Shizuoka (JP); Mitsunori Tsunoda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/615,788

(22) Filed: Jul. 10, 2003

(65) Prior Publication Data

US 2004/0016562 A1 Jan. 29, 2004

(30) Foreign Application Priority Data

Jul. 24, 2002 (JP) ...................................... 2002-214893

(51) Int. Cl.⁷ ................................................. H01B 1/00
(52) U.S. Cl. ................. 174/72 A; 174/70 C; 174/70 R; 174/68.3; 174/72 R; 174/71 R
(58) Field of Search ............................ 174/72 A, 70 C, 174/70 R (56) References Cited

U.S. PATENT DOCUMENTS

| | | | |
|---|---|---|---|
| 6,417,451 B1 * | 7/2002 | Uchiyama | 174/72 A |
| 2002/0005014 A1 * | 1/2002 | Doshita et al. | 49/360 |

FOREIGN PATENT DOCUMENTS

| | | | | |
|---|---|---|---|---|
| JP | 2001-354085 | | 12/2001 | |
| JP | 2001359232 A | * | 12/2001 | ........... H02G/11/00 |
| JP | 2002-2288 | | 1/2002 | |

OTHER PUBLICATIONS

English abstract of JP 2001359232A.*

* cited by examiner

Primary Examiner—Dean A. Reichard
Assistant Examiner—Jinhee Lee
(74) Attorney, Agent, or Firm—Armstrong, Kratz, Quintos, Hanson & Brooks, LLP (57) ABSTRACT

A harness protector for accommodating a wire harness in a protector main body in a curved shape includes a friction member for holding the wire harness in the accommodating state temporarily. The friction member abuts resiliently on the wire harness. The harness protector is provided on a sliding member or a fixed member. The wire harness is wired from the harness protector to the sliding member and the fixed member. The friction member temporarily prevents the wire harness from being removed while the sliding member moves. A spring member for biasing the wire harness in a direction where the wire harness is accommodated is provided in the harness protector. The wire harness compresses the spring member to the maximum at a first moving end of the sliding member. The friction member is disposed at a position so as not to interfere with a restoring of the spring member during moving the sliding member from the first moving end to a second moving end.

9 Claims, 6 Drawing Sheets

HARNESS PROTECTOR AND STRUCTURE FOR SUPPLYING ELECTRIC POWER USING THE PROTECTOR

BACKGROUND OF THE INVENTION

1. Field of the Invention

This invention relates to a wire harness protector to prevent the wire harness for constantly supplying electric power in such as a sliding door of a vehicle from sagging, and a structure for supplying electric power using the wire harness protector.

2. Description of the Related Art

It is necessary to constantly supply electric power from a body side to the sliding door side of the vehicle for supplying electrical components and accessories such as a speaker, a power window motor, a door lock, a switching unit, and the like with electricity, or transmitting an on/off signal to a motor for opening and closing an automatic door, regardless of whether the sliding door is open or closed. As an example for this purpose, as shown in FIG. 10, a structure for absorbing slack of a wire harness 32 at the time when the sliding door is open or closed by providing a roughly semicircle shaped protector 31 made of synthetic resin inside the sliding door vertically, accommodating the wire harness 32 in a curved shape in the protector 31, and a metal flat spring 39 biasing the wire harness 32 upward is proposed in Japanese Patent Application Laid-Open No. 2001-354085.

Figures 11, 12:
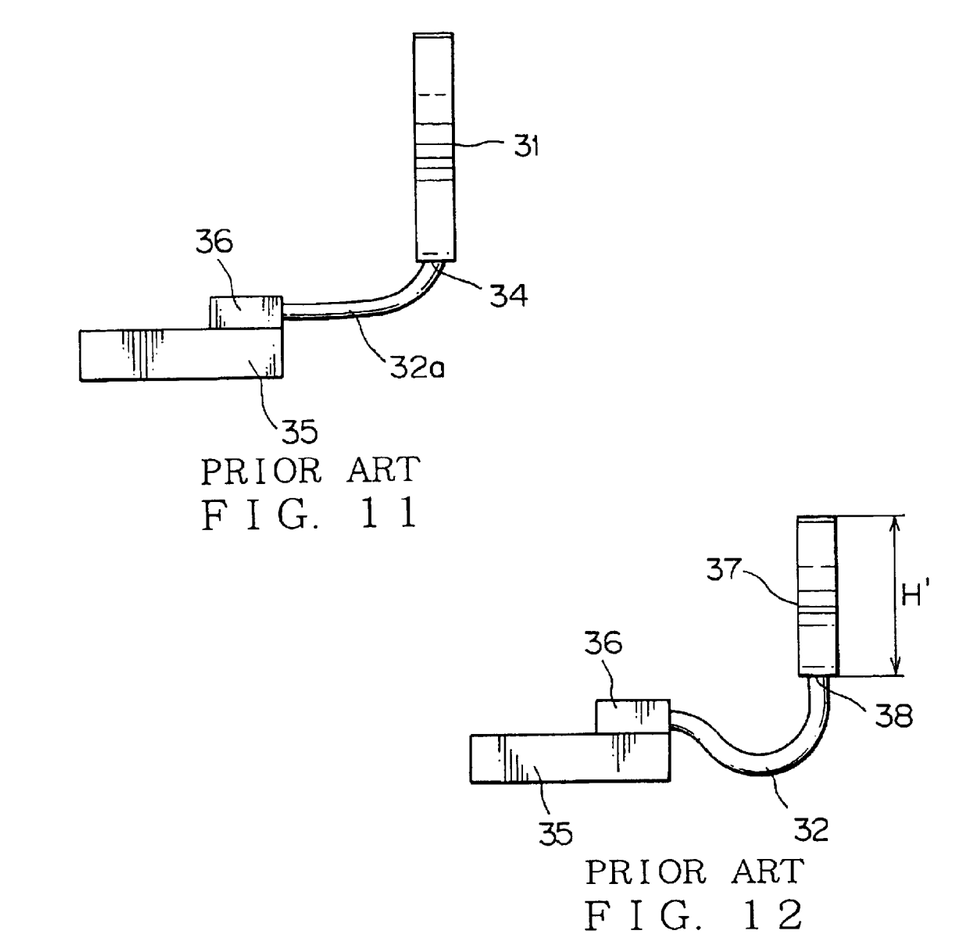
FIG. 11 is a schematic side view showing one embodiment of the conventional harness protector.
FIG. 12 is a schematic side view showing another embodiment of the conventional harness protector.

As shown in FIG. 11, a harness part 32a pulled out of a slit-shaped lower opening 34 of the protector 31 firstly passes through a connecting passage between the sliding door and the vehicle body, secondly is fixed around a step 35 at the vehicle body side by a fixing member 36, and thirdly is connected to a wire harness (not shown) at the vehicle body side. A harness part 32b pulled out of a front opening (not shown) of the protector 31 is wired in the sliding door side to be connected to a wire harness of the sliding door side, the accessory, or the like.

Figure 10:
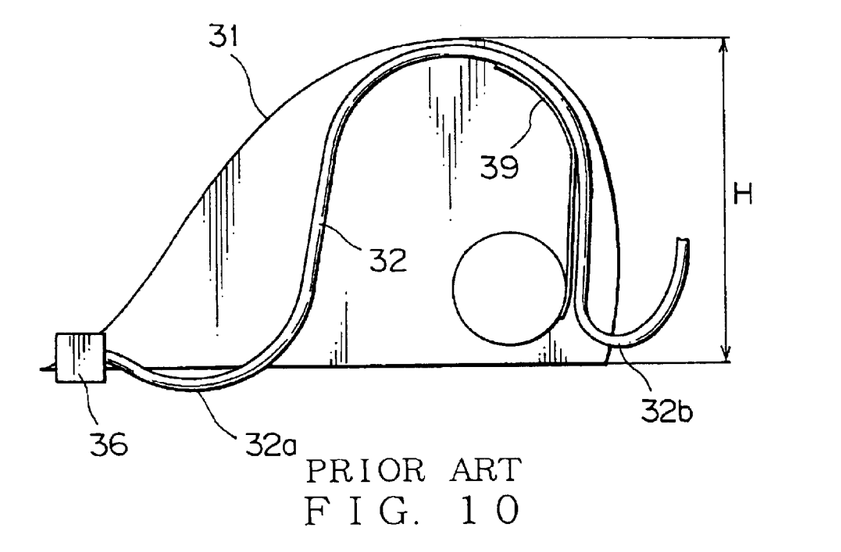
FIG. 10 is a schematic front view showing one embodiment of a conventional harness protector.

There is no problem with these conventional structures when a height H (a size in the vertical direction) of the protector 31 is relatively high as shown in FIGS. 10 to 11. However, there are problems with these conventional structures. One problem is a case that a down stroke of a window in the sliding door is long. Another problem is when electrical components, accessories and the like are disposed above the protector in the sliding door, and a height H' of a protector 37 is set low as shown in FIG. 12, as a result of balancing with a stroke length of the sliding door, there is a possibility during opening or closing of the sliding door that the wire harness 32 is not fully accommodated in the protector 37, sagging a little from a lower opening 38 of the protector 37 to interfere with an exterior or other structures of the vehicle at the connecting passage to the vehicle body.

Figure 13:
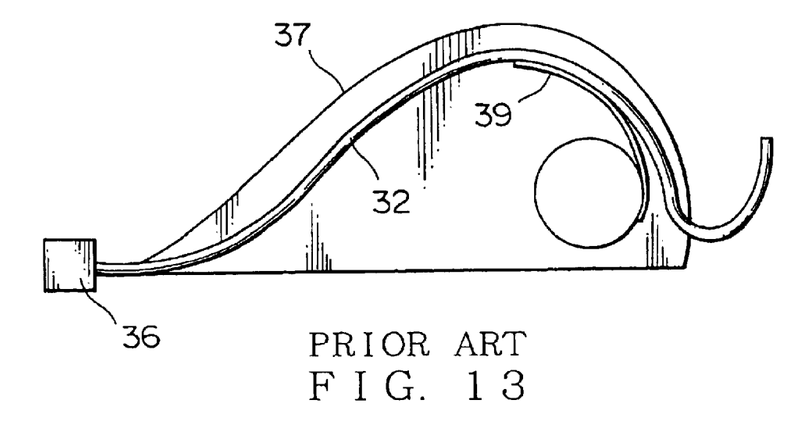
FIG. 13 is a schematic view of the conventional protector in a fully closing state of the door.
Figure 14:
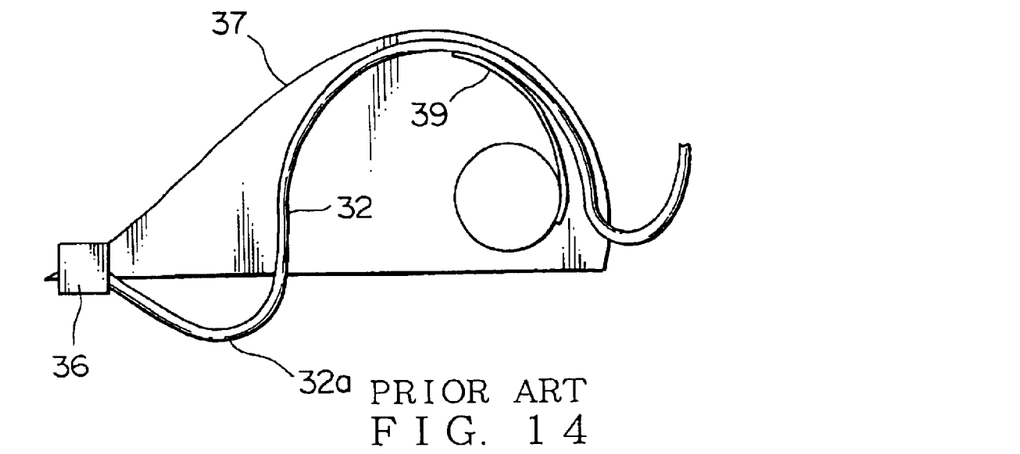
FIG. 14 is a schematic view of the conventional protector at a beginning of opening the door.
Figure 15:
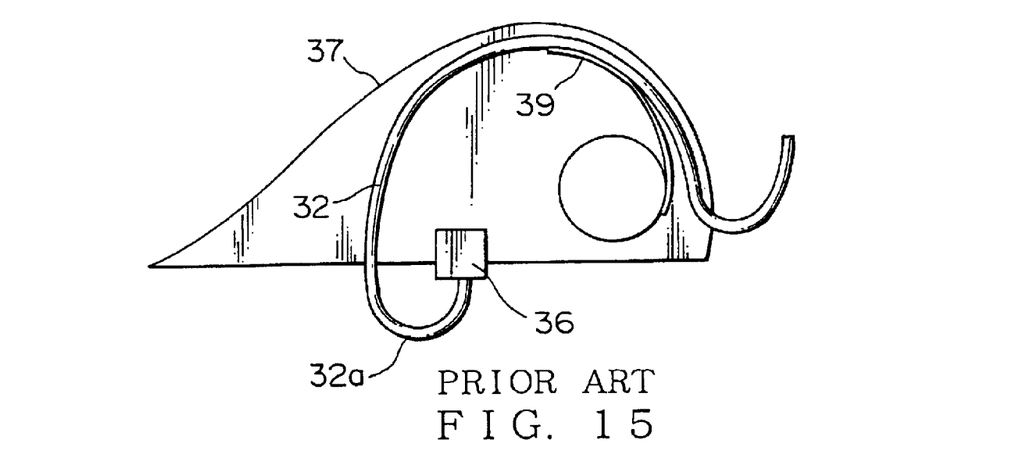
FIG. 15 is a schematic view of the conventional protector in a half-open state of the door.
Figure 16:
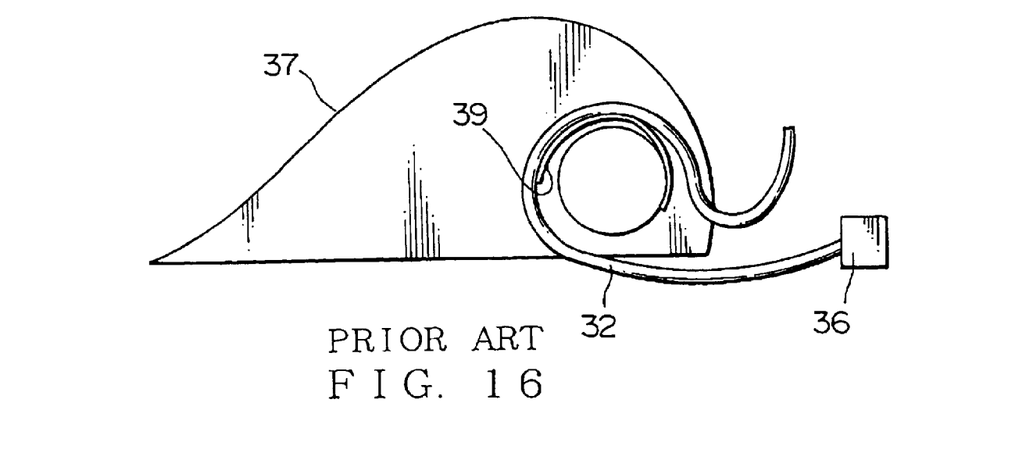
FIG. 16 is a schematic view of the conventional protector in a fully opening state of the door.

Namely, firstly as shown in FIG. 13, when the sliding door is fully closed, the wire harness 32 is pulled backward of the vehicle without slack using a harness fixing part 36 at the vehicle body side as a fulcrum, while biased upward by the flat spring 39 without problems. Secondly, as shown in FIG. 14, in a state where the sliding door is slightly open, the wire harness 32 begins sagging. Thirdly, as shown in FIG. 15, in a state that the sliding door is substantially half-open, the protector 37 cannot accommodate a whole of the wire harness 32 and the rest 32a is sagging. Fourthly, as shown in FIG. 16, in a state that the sliding door is fully open, the wire harness 32 is pulled forward of the vehicle while the flat spring 39 is largely bent downward without any problems. As described above, there is no problem when the sliding door is fully open or fully closed, however, there is a possibility that the sagging part 32a may be generated during opening or closing of the sliding door as shown in FIGS. 14, 15. This may also happen in a case that a whole length in back and forth direction of the wire harness 32 is short.

However, at the case while the sliding door is in the middle of closing, the possibility that the wire harness 32 sags is little, because the flat spring 39 bends largely to have a large restoring force when the sliding door is fully open and restores upward at a burst to bias the wire harness 32 upward.

Moreover, even if the whole length of the flat spring 39 is made so long as to absorb the slack of the wire harness 32 efficiently, on the contrary, restoring force (moment) of the flat spring 39 becomes small so that the absorbability may not be improved.

This invention has been accomplished to solve the problems and an object of this invention is to provide a harness protector and a structure for supplying electric power using the harness protector, whereby in a case that the protector is compacted in a longitudinal direction (direction of absorbing the harness slack) or a back and forth direction, the wire harness does not sag during opening or closing of the sliding door.

SUMMARY OF THE INVENTION

The object of the invention has been achieved by providing a harness protector comprising a wire harness, a harness protector main body for accommodating the wire harness in a curved shape, and a friction member for holding temporarily the wire harness in the protector main body.

According to this structure, for example, in a case that the wire harness is going to sag when the protector is arranged vertically, or run over when the protector is arranged laterally, from a state where the wire harness is accommodated in the protector main body during opening or closing of a sliding member such as a sliding door, the friction member holds the wire harness in the state of being accommodated, using its frictional resistance to prevent the wire harness from sagging or running out, namely being removed. In this manner, even a protector main body with a small capacity can accommodate without sagging or running over. Firstly, the sliding member moves some distance in the accommodating state of the wire harness. Secondly, as the sliding member moves further, the wire harness overcomes the frictional resistance to remove from the friction member. Thirdly, the wire harness is pulled in a moving direction of the sliding member without any slack.

Preferably, in this harness protector, the friction member abuts resiliently on the wire harness.

According to this structure, the wire harness pushes to compress the friction member. Then, the friction member holds the wire harness with its elastic stress that is sufficient to hold the wire harness. The sliding member moves some distance in the holding state of the wire harness. Next, as the sliding member moves further, the wire harness overcomes the frictional resistance to remove from the friction member and is pulled in the moving direction of the sliding member without slack.

Preferably, in this harness protector, the friction member is formed separately from the protector main body.

According to this structure, the separated friction member is fixed in the protector main body by a fixing means. The separated friction member can be made of such as metal with high restoring force. For example, a metallic friction member may be fixed in the protector main body by insert molding.

Preferably, in this harness protector, the friction member is formed integrally with the protector main body.

According to this structure, the integrated friction member is formed simultaneously with the protector main body by resin molding.

Preferably, in this harness protector, the harness protector includes a base and a cover, wherein the friction member is provided at the base and/or the cover.

According to this structure, the friction members provided at both the base and the cover are facing each other to clip the wire harness, while the friction member provided at the base or the cover clips the wire harness with the cover or the base. In this manner, the wire harness is maintained temporarily.

Preferably, a structure for supplying electric power using the harness protector comprises the harness protector, a sliding member, a fixed member, wherein said harness protector is provided on the sliding member or the fixed member, the wire harness is wired from the harness protector to the sliding member and the fixed member, and the friction member temporarily prevents the wire harness from being removed from the harness protector while the sliding member moves.

According to this structure, electric power is continuously supplied from the fixed member to the sliding member. When the wire harness is about to be removed from the harness protector accompanying a movement of the sliding member, the friction member holds the wire harness in the state of being accommodated to prevent the wire harness from being removed and protect the wire harness from external interference. In the holding state, the sliding member moves some distance. Then, as the sliding member moves further, an engagement between the friction member and the wire harness is released so that the wire harness is pulled in the moving direction of the sliding member without slack.

Preferably, this structure for supplying electric power using the harness protector further comprises an spring member for biasing the wire harness in the direction where the wire harness is accommodated, said spring member being provided in the harness protector, wherein the wire harness is pulled out to the maximum at a first moving end of the sliding member to compress the spring member to the maximum, and the friction member is so disposed as not to interfere with a restoring of the spring member while the sliding member moves from said first moving end to a second moving end.

In this structure, when the sliding member is about to move from the first moving end to the another moving end, because the wire harness depressing the spring member such as a flat spring, the spring member is largely bent to have large restoring force. Therefore, when the sliding member moves, the wire harness is accommodated in the protector main body at a burst by the restoring force. Because the friction member is so disposed as not to interfere these actions, namely a restoring action of the spring member and a subsequent accommodating action of the wire harness as a slack absorption, the wire harness is smoothly accommodated without any catch. When the sliding member moves from a half-open state to the second moving end side, the wire harness is pulled in the moving direction of the sliding member at the same time, so that the wire harness passes the friction member without difficulty.

Preferably, in this structure for supplying electric power using the harness protector, the friction member temporarily holds the wire harness while the sliding member moves from the second moving end to the first moving end.

In this structure, in the state that the wire harness is fully biased in the accommodating direction by the spring member, if the wire harness is still about to sag or run over, the friction member holds the wire harness in the protector main body. The sliding member continues to move in this holding state so that the wire harness is pulled in the moving direction of the sliding member at the half-open or the first moving end side to release the friction engagement with the friction member. Preferably, in this structure for supplying electric power using the harness protector, the sliding member is a sliding door, the fixed member is a vehicle body, and the harness protector is provided on the sliding door vertically.

In this structure, electric power is continuously supplied from the vehicle body to the electrical components, accessories and the like at the sliding door side. While the sliding door moves from the closing state to the half-open state, the wire harness is not fully accommodated and a rest of the wire harness tends to sag by gravity, however, the friction member holds the wire harness so high that the wire harness is fully accommodated by the friction resistance to prevent the wire harness from sagging. The sliding door continues to move in this holding state, then at around the full-open state of the sliding door, the wire harness is pulled in the moving direction of the sliding door to release the engagement with the friction member.

DESCRIPTION OF THE PREFERRED EMBODIMENT

One embodiment of the harness protector and the structure for supplying electric power using the harness protector, namely, the structure for wiring wire harness will now be described below with reference to FIGS. 1 to 2.

This harness protector 1 (hereafter referred to as "protector") is to be applied to a sliding door of a vehicle. As shown in FIG. 1, the protector 1 has a base 2 and a cover 3, both of which are made of synthetic resin, wherein a resilient friction member 6 (holding member) is provided at both the base 2 and the cover 3, for temporarily holding a wire harness 4 in the protector 1 during opening or closing of a sliding door 5 (sliding member). The protector main body is composed of the base 2 and the cover 3. Here, resistance of the friction member 6 means frictional resistance.

Figure 3:
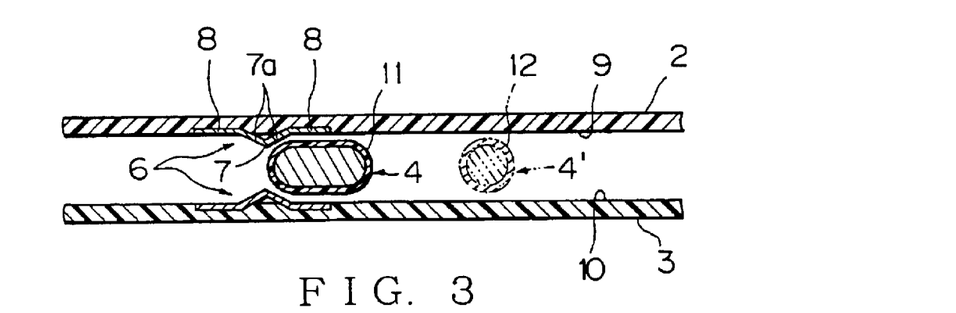
FIG. 3 is a cross-sectional view of a substantial part of the harness protector showing said one embodiment of this invention.

As shown in FIG. 3, each friction member 6 is formed by bending a substantially rectangular metal thin plate into a substantially elbowed shape, having a resilient protruding part 7 in the substantially elbowed shape and a fixed part 8 of both sides back and forth following the protruding part 7. A vertical plate width of the friction member 6 is shorter than a horizontal plate width of that. The protruding part 7 is composed of a pair, back and force continuously, of inclined pieces 7a, having an almost isosceles triangle shape. An inclination angle of the inclined pieces 7a and a height of a crest formed by the pair of inclined pieces 7a are set suitably in response to such as a size (weight) of the wire harness, namely, necessary holding power for the wire harness 4.

Fixed parts 8 of each friction member 6 are fixed to an inner surface of a substrate 9 of the base 2 and an inner surface of a substrate 10 of the cover 3 respectively by bonding, welding, screw, rivet, insert molding, or the like. Therefore, a pair of friction members 6 is arranged facing each other, and the protruding part 7 is allowed to be resiliently deformed in a plate thickness direction of the protector 1. As shown in FIG. 3, it is preferable for protecting interference between the fixed part 8 and the wire harness 4 that each fixed part 8 is arranged to be flush with each inner surface of substrates 9, 10 of the base 2 and the cover 3, or at least not to protrude from each inner surface of substrates 9, 10.

Figure 4:
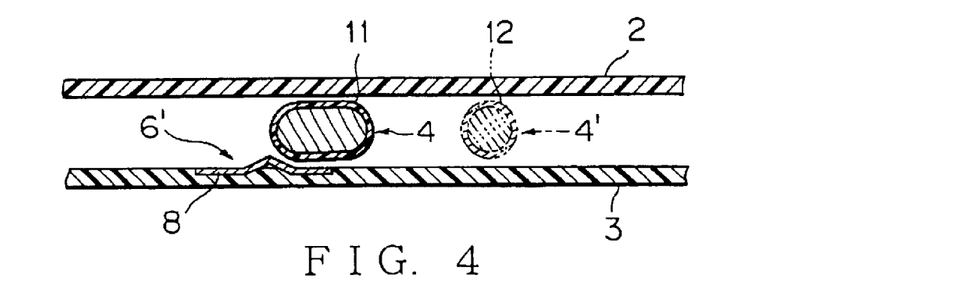
FIG. 4 is a cross-sectional view of a substantial part of a harness protector showing another embodiment of this invention.
Figure 5:
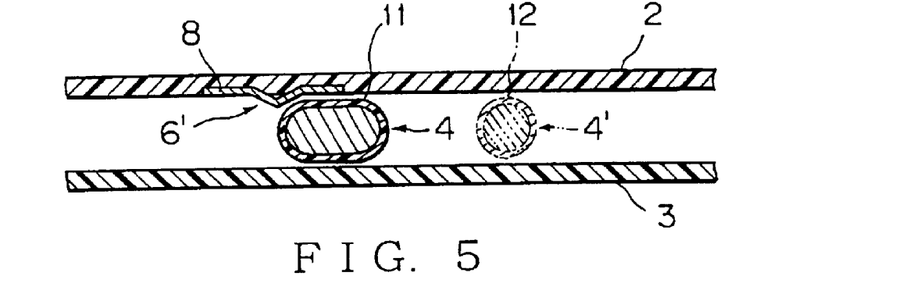
FIG. 5 is a cross-sectional view of a substantial part of a harness protector showing the other embodiment of this invention.

It is possible that a friction member 6' is only provided at the cover 2 as shown in FIG. 4 and it is also possible that the friction member 6' is only provided at the base 3 as shown in FIG. 5. In this case, the holding power for the wire harness 4 is set suitably, for example, by the crest of the friction member 6' being higher than that of the friction member 6 arranged at both the base 2 and the cover 3 in FIG. 3. A basic configuration of the friction member 6' is the same as that of the friction member 6 in FIG. 3. Preferably, a surface of the fixed part 8 is flush with the inner surface of the cover 3 or the base 2.

In FIGS. 3 to 5, a solid line shows the wire harness 4 having a corrugate tube 11 with an oval cross-section (flat type), and a chain line shows a wire harness 4' having a corrugate tube 12 with a circle cross-section. The flat type corrugate tube 11 contributes a flattened protector 1 or an increased number of accommodated electric wire, namely, a number of electric circuits.

As shown in FIGS. 3 to 5, the wire harness 4 deforms the protruding part 7 in a direction of compressing the protruding part 7, while slidably moving on the inclined surface of the inclined pieces 7a, to be depressed and held at the almost center position of the protruding part 7. The friction member 6 or 6' is arranged in this manner. Because the protruding part 7 substantially contacts face to face with the wire harness 4 or 4' while being compressed, the protruding part 7 acquires a stable holding power for the wire harnesses 4 or 4' and the wire harness 4 or 4' is allowed to smoothly slidably move on the protruding part 7, so that the corrugate tube 11 or 12 of the wire harness 4 or 4' is protected from frictional wear. Because the corrugate tube 11 with an oval cross-section has a larger holding area than the corrugate tube 12 with a circle cross-section has, the corrugate tube corrugate tube 11 is held more reliably than the corrugate tube 12.

Figure 1:
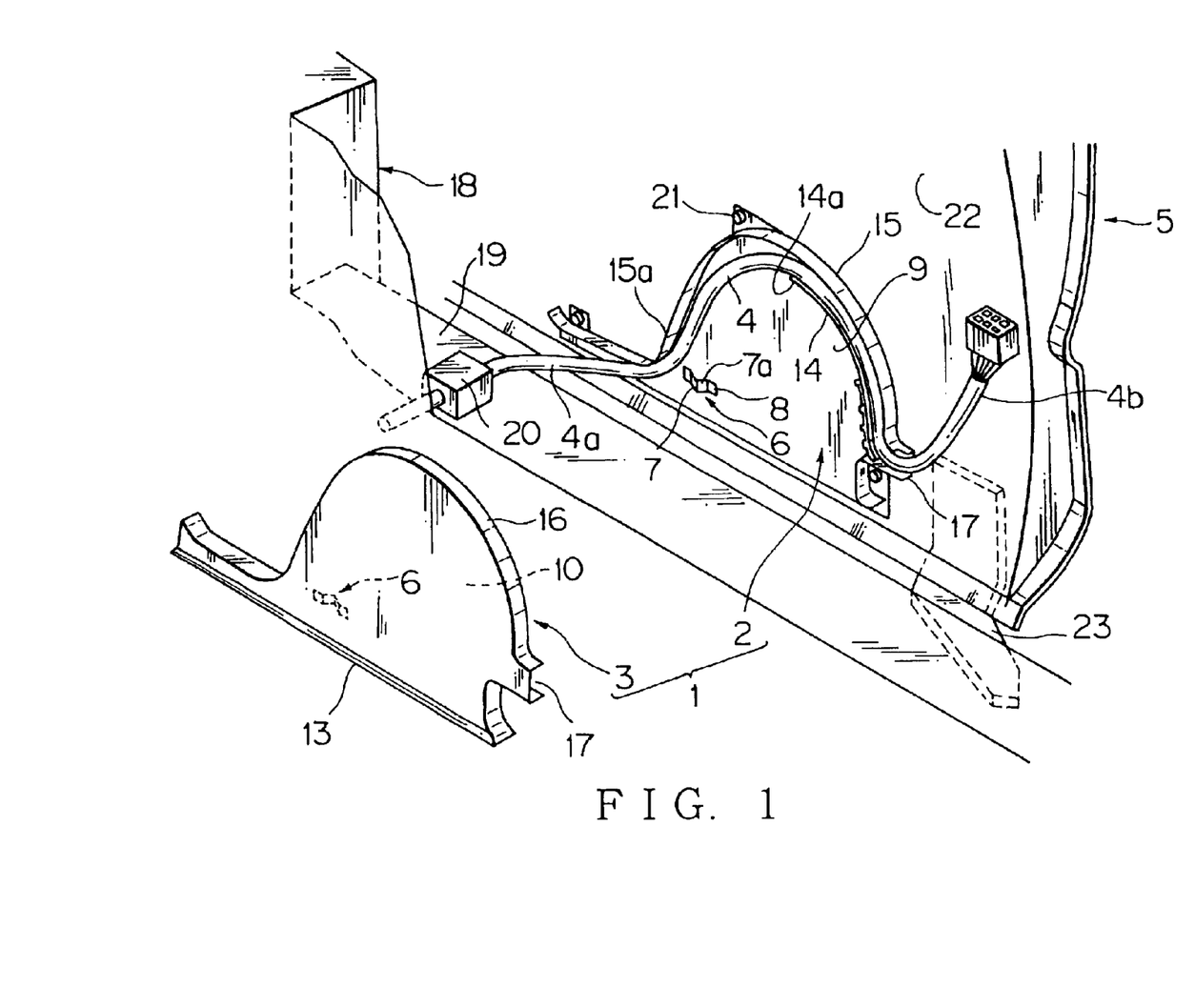
FIG. 1 is an exploded perspective view of a closing state of a sliding door, showing one embodiment of a harness protector and a structure of supplying electric power using the harness protector according to this invention.

As shown in FIG. 1, the friction member 6 is positioned at a back side of the protector 1 and a little higher than a lower opening 13 having a slit shape. The wire harness 4 is clipped (caught) by the pair of friction members 6 facing each other while opening or closing the sliding door 5 and held temporarily, so that the slack of the wire harness 4 is absorbed and prevented from sagging. Of course, the slack of the wire harness 4 is mainly absorbed by a flat spring 14, namely a resilient member or an spring member, in the protector 1, and the friction member 6 serves as an auxiliary member for helping the flat spring 14 to absorb the slack of the wire harness 4. Thus, the wire harness 4 smoothly passes between the pair of friction members 6 while compressing the friction members 6 in a thickness direction of the friction members 6.

Other components of the protector 1 is almost the same as those of conventional protectors except that those of the protector 1 have a lower height and are more compact than those of the conventional protectors. Namely, each of the base 2 and the cover 3 has a substantially arc shaped peripheral wall 9, 10 at the upper side of the substrate 9, 10 and has a lower opening 13 slitting laterally and a front opening 17 with a small diameter at a lower end of the substrate 9, 10. A base of the flat spring 14 is fixed to the base 2 near the front opening 17. A free end 14a of the flat spring 14 is allowed to move slidably along the wire harness 4. The protector 1 is composed of the protector main body 2, 3 and the friction member 6 and the flat spring 14.

A harness part 4a drawn from the lower opening 13 of the protector 1 to a vehicle body 18 (fixed member) side is supported by a harness fixing part 20 (fastening device), and fluctuates back and forth around the fixing part 20 during the opening and closing of the sliding door 5. The harness part 4a is connected to a wire harness of the vehicle body side via the fixing part 20.

Additionally, a harness part 4b drawn from the front opening 17 is connected to a wire harness, an accessory, or the like at the sliding door side. The wire harness 4 is composed of a plurality of electric wire covered by flexible corrugate tube with an oval cross-section 4, or such tube with a circle cross-section 4', both made of synthetic resin, and arranged slidably between the substrates 9, 10 of the base 2 and the cover 3.

As shown in FIG. 1, The base 2 is fixed at a door panel 22 of the sliding door 5 by a fixing means such as a locking clip or a bolt, and the cover 3 is engaged with the base 2 by an engaging means (not shown) such as an engaging projection or an engaging frame. Then, a door trim (not shown) is mounted on the door panel 22 so that the protector 1 is positioned between the door trim and the door panel 22. In FIG. 1, reference numeral 23 indicates a slider at the door side for slidably engaging with a guiding rail of the vehicle body side.

Figure 2:
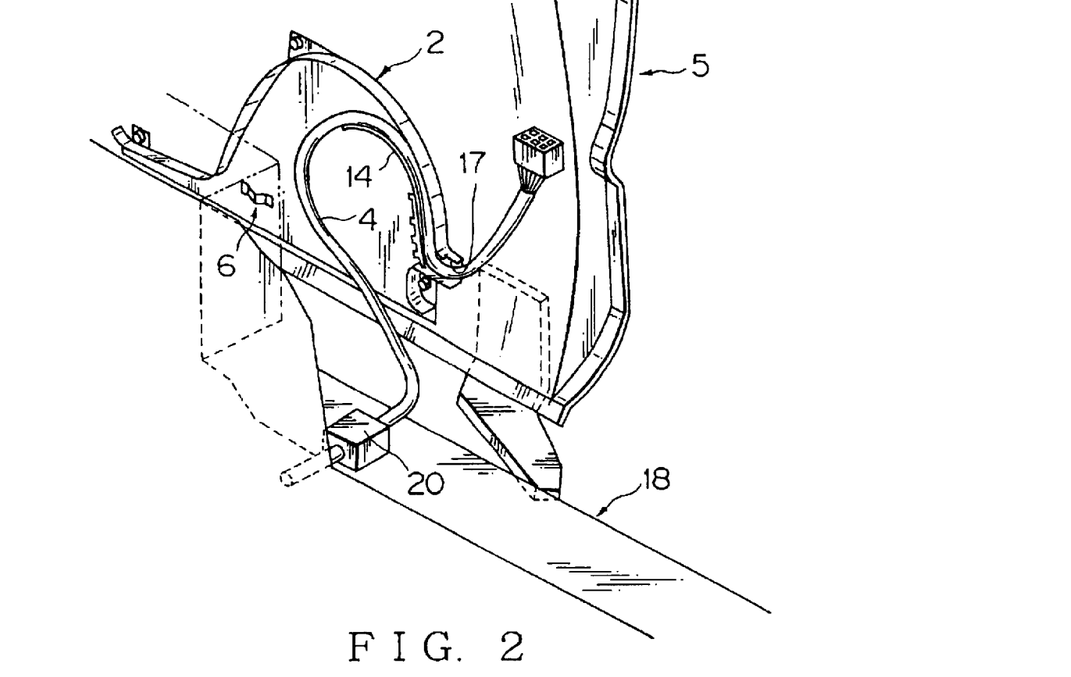
FIG. 2 is a perspective view of an opening state of a sliding door, showing the harness protector and the structure of supplying electric power using the harness protector.

FIG. 1 shows the almost fully closing state of the sliding door 5, and FIG. 2 shows the almost fully open state of the sliding door 5. In the closing state of FIG. 1, the wire harness 4 bends the flat spring 14 downward while being pulled backward and positioned at the back side of the protector 1, and at a back side of the friction member 6, namely, between the friction member 6 and a back peripheral wall 15a.

In the almost fully opening state of FIG. 2, the wire harness 4 passes the friction member 6 while being pulled forward with the fixing part 20 at the vehicle body side being fixed as a fulcrum, and bends the flat spring 14 downward while being curved with a small diameter. The wire harness 4 is positioned between the friction member 6 and the front opening 17 in a curved shape. In the half-open state between the closing state of FIG. 1 and the opening state of FIG. 2, the friction member 6 catches the wire harness 4 of the protector 1 to hold the wire harness 4 temporarily, so that the wire harness 4 is prevented from sagging.

A function of the friction member 6 will be described in detail with reference to FIGS. 6 to 9.

Figure 6:
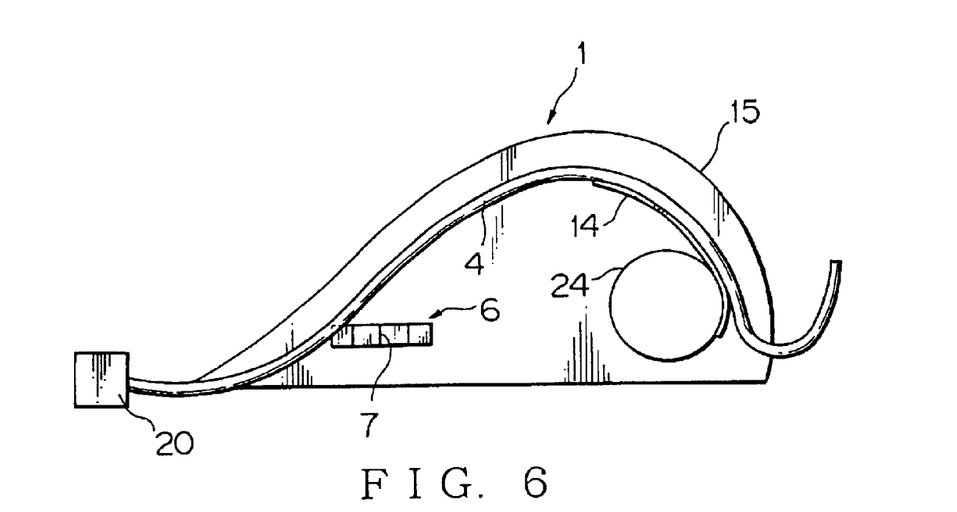
FIG. 6 is a schematic view of the harness protector in a fully closing state of the sliding door.

FIG. 6 shows the fully closing state of the sliding door 5. Like in FIG. 1, the wire harness 4 is pulled backward without slack, and the protruding part 7 in the center of the friction member 6 in the protector 1 is arranged not in contact with the wire harness 4. The flat spring 14 is deformed downward slightly by the wire harness 4 pressing the flat spring 14. In FIG. 6, reference numeral 20 indicates a harness fixing part of the vehicle body side, and reference numeral 24 indicates a bending regulation wall (not shown in FIGS. 1 and 2) for regulating the bend of wire harness 4.

Figure 7:
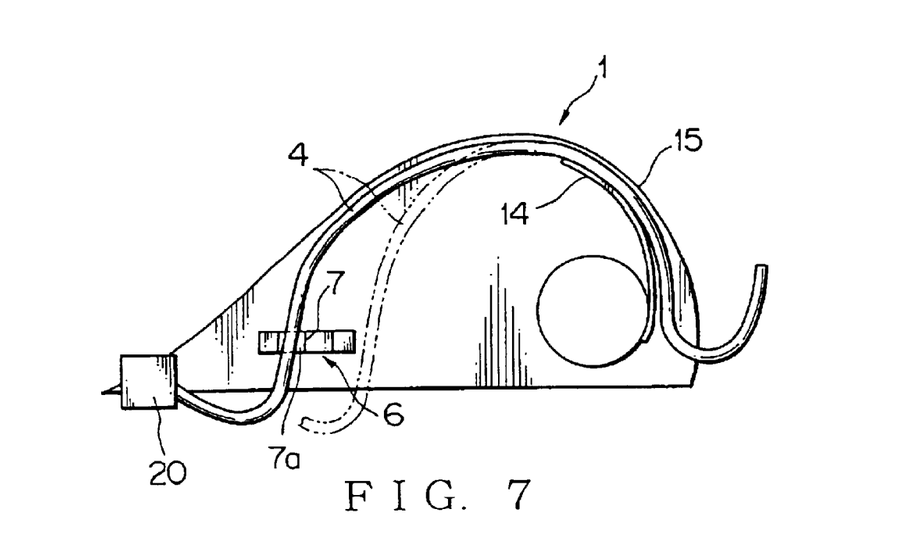
FIG. 7 is a schematic view of the harness protector at a beginning of opening the sliding door.

When the sliding door 5 begins to be opened from the fully closing state shown in FIG. 6, the protector 1 moves backward in conjunction with the sliding door, while the fixing part 20 doesn't move. In the half-open state of the sliding door 5 as shown in FIG. 7, the wire harness 4 comes in contact with the friction member 6 while being pulled upward by the biasing force of the flat spring 14 in the protector 1. Then the wire harness 4 is held in the state of being pulled upward by the frictional force with the friction member 6. Because the inclined piece 7a at the back side of the protruding part 7 of the friction member 6 is pressing the wire harness 4, the wire harness 4 is held in a position along an upper peripheral wall 15 in a curved shape.

A chain line in FIG. 7 shows a track of the wire harness 4 in a case that the protector 1 has no friction member 6. The wire harness 4 in this case is positioned ahead of, and vertically lower than that in a case that the protector 1 has the friction member 6. The track of the wire harness 4 is changed higher by the friction member 6 to prevent the wire harness 4 from sagging. Here, for convenience's sake, the half-open state of the sliding door 5 is defined as not limited to a state that the sliding door is just half-open, but a state that the sliding door 5 is nearly half-open.

When using the pair of friction members 6 facing each other as shown in FIG. 3, the wire harness 4 is clipped between the pair of the friction members 6 to be held in the state of being pulled upward. When using only the friction member 6' at the cover 3 side as shown in FIG. 4, the wire harness 4 is clipped between the base 2 and the friction member 6' to be held. When using only the friction member 6' at the base 2 side as shown in FIG. 5, the wire harness 4 is clipped between the cover 3 and the friction member 6' to be held. Thus, the wire harness 4 is prevented from sagging.

Figure 8:
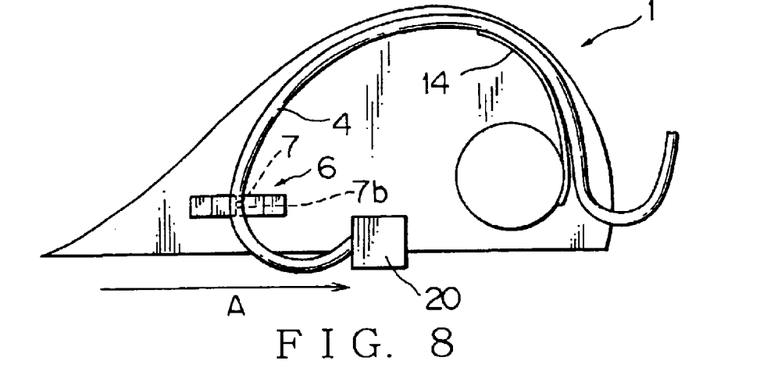
FIG. 8 is a schematic view of the harness protector in a half-open state of the sliding door.

When moving the sliding door 5 further in the opening direction like an arrow A of FIG. 8 from the holding state of the wire harness 4 in FIG. 7, the wire harness 4 is rocked a little using the fixing part 20 as a fulcrum while being held by the friction member 6. The wire harness 4 is positioned in a substantial center of the protruding part 7 of the friction member 6 to be held by the tip 7b of the protruding part 7. Point contact between the wire harness 4 and the tip 7b is preferable to line contact from a viewpoint of wear prevention. Thus, the protruding part 7 holds the wire harness 4 without slack while the wire harness 4 is moving. Because an amount of bending of the flat spring 14 in FIG. 7 is substantially the same as that in FIG. 8, the wire harness 4 is positioned along the upper peripheral wall 15 of the protector 1 without pushing the flat spring 14 downward so much.

Figure 9:
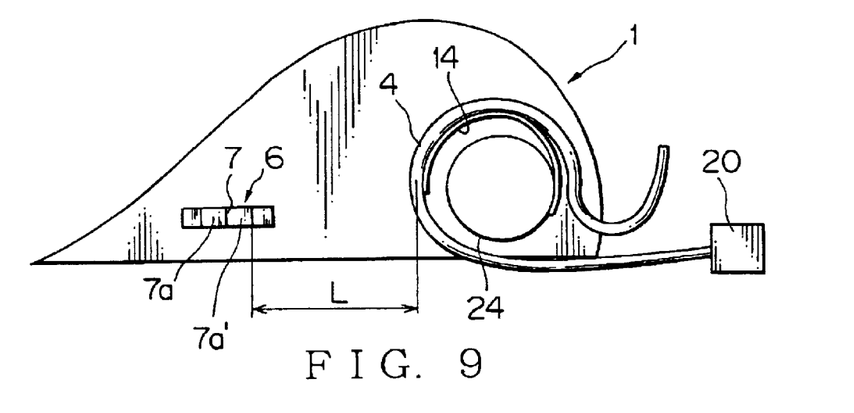
FIG. 9 is a schematic view of the harness protector in a fully opening state of the sliding door.

In the middle of moving the sliding door 5 backward in the direction of opening it from the state of holding the wire harness 4 in FIG. 8, the wire harness 4 becomes free from the friction member 6, and the wire harness 4 largely bends the flat spring 14 downward while being biased upward by the large restoring force of the flat spring 14. Then, the sliding door 5 becomes the fully opening state as shown in FIG. 9. In the fully opening state of the sliding door 5 as shown in FIG. 9, the wire harness 4 is curved with a small diameter along the bending regulation wall 24 and pulled forward without slack. The fully closing state in FIG. 6 and the fully opening state in FIG. 9 are similar to those of the conventional protector having no friction member 6.

In reverse, when moving the sliding door 5 forward in the direction of closing it from its fully opening state in FIG. 9, because the flat spring 14 is bent so much as to preserve the biasing force, the wire harness 4 is inserted into the protector 1 at a burst with the large biasing force to be accommodated without slack. The protruding part 7 of the friction member 6 is disposed at a position so as not to interfere the biasing force of the flat spring 14, namely is separated from the wire harness 4 in a distance L in FIG. 9 in this process. Thus, in the middle of the closing of the sliding door 5, the wire harness 4 is accommodated without slack reliably.

Next, when the sliding door 5 is further moved forward in the direction of closing it, the wire harness 4 passes the friction member 6 at a burst with the biasing force of the flat spring 14 at the half-open state of the sliding door 5 in FIG. 8 to run into the fully closing state of the sliding door 5. The harness holding state in FIG. 7 is only occurred at the opening operation of the sliding door 5.

When closing the sliding door 5, because it is not necessary for the friction member 6 to hold the wire harness 4, an inclination angle at a front side of the inclined piece 7a' (FIG. 9) of the friction member 6 is allowed to be smaller than an inclination angle at a back side of the inclined piece 7a of that.

In this embodiment, the friction member 6 provided on the protector main body 2, 3 is independent of the protector main body 2, 3. However, the friction member 6 may be made of synthetic resin or rubber integrally with the protector main body 2, 3.

In this case, various forms can be set up suitably as a form of the friction member 6 made of synthetic resin, such as a form composed of the resilient protruding part 7 bending in a substantially elbowed shape like the form in above described embodiment, a form of which one side of the resilient elbow shaped protruding part 7 is a free end, or a form which is protruding a little longer horizontally.

Moreover, the form of the rubber protruding part 7 may be a substantially hemispherical shape, or protruding lines horizontally or vertically besides above described forms to be fixed to the protector main body by such as bonding or welding. These friction members are allowed to be arranged in patterns of FIGS. 3 to 5 at the base 2 or the cover 3.

Moreover, not only a resilient member but also a plastic member protruding from the protector main body integrally in a substantially hemispherical shape or protruding lines horizontally or vertically is acceptable as the friction member 6. This plastic member creates frictional resistance by abutting on the resilient corrugate tube 11, 12, resilient protecting tube, or a plurality of electric wire wrapped by a vinyl tape to serve the same as the resilient friction member.

Moreover, the protector main body may be composed of the base 2 and the cover 3 integrally by plastic molding. Moreover, other resilient member is acceptable instead of the flat spring 14. Moreover, it is also acceptable that the wire harness 4 itself is resilient in the accommodation direction so as not to use other resilient member such as the flat spring 14. A cab tyre cable or an electric wire is allowed to serve as a wire harness 4.

Moreover, in above described embodiment, the protector 1 is provided on the sliding door 5, but is allowed to be provided on the vehicle body 18 transversally. In this case, the biasing direction of the flat spring 14 and the slack absorption direction are horizontal.

Moreover, the protector 1 is for supplying electric power to the sliding door 5, however, is also acceptable for supplying electric power to a hinge door, a back door, or sliding members except for a vehicle.

Although this invention has been fully described by way of examples with reference to the accompanying drawings, it is to be noted that various changes and modifications can be made in a scope of this invention.

What is claimed is:

1. A harness protector comprising:

a wire harness;

a harness protector main body for accommodating the wire harness in a curved shape; and a separate friction member having a resilient protruding part with inclined pieces in one of a substantially triangular, hemispherical or round shape attached to a peripheral wall of at least one of a base or cover, the friction member only temporarily contacting with and holding the wire harness in the protector main body.

2. The harness protector as claimed in claim 1, wherein the friction member abuts resiliently on the wire harness.

3. The harness protector as claimed in claim 1, wherein the friction member is formed separately from the protector main body.

4. The harness protector as claimed in claim 1, wherein the friction member is formed integrally with the protector main body.

5. The harness protector as claimed in claim 1, wherein the harness protector main body includes a base and a cover, and wherein the friction member is provided on at least one of the base and the cover.

6. A structure for supplying electric power using the harness protector as claimed in claim 1, comprising:

the harness protector;

a sliding member; and a fixed member, wherein said harness protector is provided on the sliding member or the fixed member, the wire harness is wired from the harness protector to the sliding member and the fixed member, and the resilient protruding part of the friction member temporarily contacts the wire harness and prevents the wire harness from being removed from the harness protector while the sliding member is moving.

7. The structure as claimed in claim 6, comprising:

a spring member for biasing the wire harness in a direction where the wire harness is accommodated, said spring member being provided in the harness protector, wherein the wire harness is pulled out to the maximum at a first moving end of the sliding member to compress the spring member to the maximum, and the friction member is so disposed as not to interfere with a restoring of the spring member while the sliding member moves from the first moving end to a second moving end.

8. The structure as claimed in claim 6, wherein the friction member temporarily contacts and holds the wire harness while the sliding member moves from a second moving end to the first moving end.

9. The structure as claimed in claim 6, wherein the sliding member is a sliding door, the fixed member is a vehicle body, and the harness protector is provided on the sliding door vertically.

* * * * *